United States Patent Office 3,655,826
Patented Apr. 11, 1972

3,655,826
ACRYLIC ELASTOMER IMPACT MODIFIER
Robert Paul Fellmann, Wrightstown, and Robert Clarke Fettes, Feasterville, Pa., assignors to Rohm and Haas Company, Philadelphia, Pa.
No Drawing. Continuation-in-part of application Ser. No. 734,541, June 5, 1968. This application May 8, 1969, Ser. No. 823,147
Int. Cl. C08f 29/24, 29/50, 33/08
U.S. Cl. 260—876 R                            14 Claims

ABSTRACT OF THE DISCLOSURE

Three-stage acrylic elastomer impact modifiers are provided. The polymers comprise a first stage of crosslinked polyacrylate rubber followed by a rigid styrene-type stage, followed in turn by a stage of rigid polymer chosen for compatibility in the polymer to be modified. The modifier is particularly useful as an impact strength improver, processing aid and/or heat distortion temperautre improver in vinyl chloride polymers.

---

This application is a continuation-in-part of pending application Ser. No. 734,541, filed June 5, 1968, now abandoned.

This invention relates to a three- or more stage polymer modifier which improves the impact strength of other polymers. This invention relates to multi-stage heteropolymers which, when admixed with thermoplastic polymers such as vinyl chloride polymers, yield thermoplastic polymers possessing excellent physical properties which are, more particularly, tough, hard, rigid, impact-resistant, durable, and processable compositions possessing good resistance to deformation at elevated temperatures under load (hereinafter referred to as DTUL). Further, this invention relates to three-stage heteropolymers wherein the first stage comprises the mers of crosslinked acrylates, the second stage comprises the mers of styrene or substituted styrene or mixtures of them, sometimes preferably crosslinked, and the third stage comprises non-crosslinked mers or co-mers chosen as to composition and as to quantity upon consideration of the following factors: compatibility of modifier with the polymer or polymers to be modified, the effect of the modifier on the DTUL of the polymer, the impact strength desired, and the durability upon exposure to the elements including the weather.

The latter stages of the three- or more stage heteropolymer of this invention are polymerized in the presence of the earlier stage or stages. The last or third stage (stage III) is a thermoplastic polymer comprised of monomers chosen from the group consisting of alkyl methacrylates or acrylates, cyclohexyl, aryl, alkaryl or aralkyl methacrylates or acrylates, monovinyl aromatic compounds such as styrene, vinyltoluene, and α-methylstyrene, acrylonitrile and methacrylonitrile, and monovalent bicyclic hydrocarbon methacrylates (hereinafter referred to as bicyclic methacrylates or acrylates) or acrylates which contain a methacryloyl radical or group bonded to a six-membered carbon bridged ring that has the following formula:

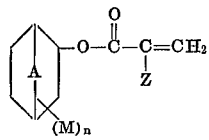

where
A is —CH$_2$—, —CH(CH$_3$)—, or —C(CH$_3$)$_2$—,
Z is selected from the group consisting of a hydrogen atom and a methyl group M is selected from the group consisting of a hydrogen atom and a methyl group, and $n$ is a member having an average value of 0 to 3. These monomers are polymerized in the presence of the particles of the earlier stages. These particles of the earlier stages comprise a polymer (stage II) consisting of monovinyl aromatic compounds or at least one monovinyl aromatic compound and at least one polyethylenically unsaturated monomer, said stage II being polymerized in the presence of the earlier stage or stages. The particles are continuously dispersed or suspended in the aqueous medium. The first stage (stage I) polymerized in the aqueous medium, is present throughout the polymerization of the subsequent stages. Stage I is comprised of a copolymer consisting of at least one monomer chosen from the group consisting of alkyl or alkoxyalkyl acrylates having 2 to 14 carbon atoms having a second order transition temperature of not above —20° C. and at least one polyethylenically unsaturated monomer.

Exemplary of the bicyclic methacrylate or acrylate esters described by the above formula are isobornyl methacrylate and acrylate, bornyl methacrylate and acrylate, fenchyl methacrylate and acrylate, isofenchyl methacrylate and acrylate, norbornyl methacrylate and acrylate, and mixtures of these bicyclic methacrylates and acrylates. These esters are known compounds and may be prepared in known fashion. For example, bornyl methacrylate may be prepared from α-pinene and methacrylic acid, and the isobornyl ester may be prepared from camphene and methacrylic acid in known manner.

The compositions of this invention are effective as impact strength improvers in rigid plastics. For example, the compositions of this invention are particularly preferred as modifiers for vinyl chloride polymers. The term "vinyl chloride polymers" is defined for the purposes of this application to include homopolymers of vinyl chloride as well as copolymers thereof with minor proportions of other ethylenically unsaturated compounds. The term also is used to refer to chlorinated vinyl chloride polymers. Preferably, the vinyl chloride polymer employed is a homopolymer of vinyl chloride, i.e., polyvinyl chloride. However, the vinyl chloride polymer can also contain up to about 20% by weight of other ethylenically unsaturated compounds copolymerizable with vinyl chloride; conversely stated, the resin should contain at least 80% by weight of vinyl chloride copolymerized therein. Ethylenically unsaturated compounds which are suitable in this respect include, for example, vinyl alkanoates, such as vinyl acetate, vinyl propionate, and the like; vinyl halides, such as vinylidene bromide, vinylidene chloride, vinylidene fluorochloride, and the like; unsaturated hydrocarbons, such as ethylene, propylene, isobutylene, halogenated (i.e., chlorinated) hydrocarbons such as chlorinated ethylene and the like; allyl compounds such as allyl acetate, allyl chloride allyl ethyl ether and the like, etc. These unsaturated compounds may be copolymerized or polymerized in situ with the vinyl chloride or may be polymerized separately and added as a modifier to the polyvinyl chloride.

The modifiers of this invention may be used in polymers with an extremely wide range of molecular weights. For example, an indication of the preferred molecular weight of those vinyl chloride polymers, preferred and particularly useful, may be obtained by reference to the Fikentscher K-value of the vinyl chloride polymer and those resins having a Fikentscher K-value of about 45 and higher, and preferably between 45 and 90.

Rigid polymers such as vinyl chloride polymers commonly offer limited resistance to sharp impact. It is well known in the art that styrene and substituted styrene polymers, acrylonitrile and methacrylonitrile polymers, acrylic polymers, vinyl chloride polymers and copolymers of all these polymers may be toughened by the addition of rubbery materials. Such common modifiers include butadiene or butadiene-styrene rubbers, acrylonitrile-butadiene-styrene modifiers, crosslinked alkyl acrylates, and the like. These and other common modifiers improve the impact strength of rigid polymers including vinyl chloride polymers; however, most of the other physical or chemical properties are substantially or even seriously affected. Some of the qualities and characteristics of the polymer most adversely affected include: the DTUL, mechanical properties such as modulus and strength, weathering resistance as characterized by either appearance and/or reduction of the physical properties, processing characteristics, consistency from batch to batch and within the part calendered, extruded, or molded therefrom as to the physical characteristics including impact resistance, impact resistance with pigment or filler loading, clarity, flame resistance and the like.

A particularly critical problem present with rigid vinyl chloride polymer compositions is that the articles fabricated therefrom have a relatively low service temperature. In practice, the practical service temperature of thermoplastic bodies is dictated by the softening temperature of the thermoplastic material, or by its heat distortion temperature, or by its deformation temperature under load, said terms denoting the lowest temperature at which the material being tested, of specific dimensions, yields a specified distance under a specified loading (DTUL). For example, the service temperatures of reasonably processable vinyl chloride polymers are about 140–160° F., a temperature range which prevents the material from finding use in many applications; for example, in hot-fill food packaging applications, or in applications involving cleaning temperatures of hot water or even in outdoor applications in the sun, particularly when used in dark colors. For example, it is most difficult to retain the service temperature of chlorinated polyvinyl chloride when adding modifiers heretofore suggested for improved processing and/or impact strength. The modifiers of this invention substantially improve the processing characteristics, in particular thermoformability, while increasing the impact strength of chlorinated polyvinyl chloride. Modifiers which improve the DTUL characteristics of rigid vinyl chloride polymers have recently been introduced in the art. Such modifiers include polymers containing the bicyclic methacrylates described above, polymers containing α-methylstyrene, polymers containing acrylonitrile, polymers containing mixtures of these monomers, and the like. These polymers, while they effectively increase the DTUL, substantially detract from the polymers' resistance to impact or reduce the effectiveness of common impact modifiers. As noted above, common impact modifiers generally reduce the heat distortion temperature or other properties; thus, only a comprise balance of properties is available in the field, making commercial acceptance limited. This invention is directed to offering a modifier which may be used to obtain a polymer that offers all or most of the following characteristics: good impact strength at low levels of incorporation of the modifier, good resistance to DTUL at elevated temperatures, good processability, good outdoor weather resistance, good chemical resistance, and the like. For example, when the modifiers are included in vinyl chloride polymers, they are so effective that excellent flame resistance is retained. Also, for example, the inclusion of the modifiers of this invention actually improves the processability of vinyl chloride polymers, i.e., thermoformability. The conventional impact modifiers all fail to achieve these aims. Butadiene and butadiene-styrene modifiers are unsuitable, for example, they lack outdoor durability, reduce the service temperature, etc. Common polyalkyl acrylate elastomer modifiers are effective for improving the impact strength of vinyl chloride polymers. However, when these vinyl chloride polymers contain a DTUL improver, these common polyalkyl acrylate elastomers are not nearly so effective in raising the impact strength when added and, further, the DTUL characteristics are made deficient. Further, these common modifiers are less effective in providing high impact strength when the modified thermoplastic polymer, such as the vinyl chloride polymer, is pigmented or filled with inorganic materials or incompatible organic materials. Further, it has been found that the common modifiers are extremely sensitive to processing conditions; for example, the impact strength varies substantially depending upon the extrusion temperature or in the degree of processing as in injection molding. The polymers of this invention offer substantial advantages over common modifiers in most individual characteristics, and further, the balance of properties offered is substantially better in all cases.

The polymers of this invention are prepared using aqueous emulsion or suspension techniques in three or more stages. Polymerization of each stage should be generally and preferably essentially complete before starting polymerization of a subsequent stage.

Stage I comprises an alkyl, alkoxyalkyl or alkylthioalkyl acrylate crosslinked preferably by di- and/or polyfunctional monomers commonly used in the art. Alternative methods of crosslinking include the use of functional monomers which, when postreacted, give rise to covalent crosslinks. The composition of stage I is critical to the invention in order to obtain satisfactory retention of appearance and/or physical properties upon exposure to the elements, particularly outdoors. The alkyl or alkoxyalkyl acrylate chosen depends on the polymer to be modified as well as the amount and type of crosslinker chosen. In general it is preferred that the alkyl or alkoxyalkyl portion of the acrylate should contain no more than 14 carbon atoms, and is preferably not branched. A polymer with a glass temperature less than $-20°$ C. is preferred. Acrylate mers preferred include ethyl acrylate, n-butyl acrylate, 2-ethylhexyl acrylate, myristyl acrylate, butoxyethyl acrylate, etc. A particular preference is n-butyl acrylate, which is particularly effective in modifying vinyl chloride resins, and offers excellent outdoor durability among other advantages. The choice of the crosslinking monomer is not critical and the compounds found effective include 1,3-butylene dimethacrylate, ethylene diacrylate or methacrylate, trimethylolethane di- or triacrylate or methacrylate, trimethylolpropane di- or triacrylate or methacrylate, glyceryl di- or triacrylate or methacrylate, the polyacrylate or methacrylate of pentaerythritol, divinyl or trivinylbenzene, etc. As the amount of 1,3-butylene diacrylate in the first stage of the modifier is increased, the modified compound during extrusion yields reduced swelling of the polymer melt as it emerges from the die-lips, as compared to the size of the die aperture. A preferred crosslinking monomer is 1,3-butylene diacrylate. Other difunctional polymerizable monomers will immediately occur to one skilled in the art as possible substitutions, and these will include diallyl carbonate, diallyl phthalate, diallyl ether, divinyl ether, etc. The ratio of the polyfunctional monomer to the alkyl or alkoxyalkyl acrylate is critical. As the amount of crosslinking monomer is reduced, the modifier begins to behave erratically and the impact strength of the extruded or molded part may be much less than desired or the physical properties will be quite sensitive to the processing conditions. As the amount of the crosslinking monomer is increased the impact strength obtained is decreased. The amount of crosslinking monomer can range from about 0.05 to 2.0 percent and above by weight based on the weight of the alkyl, alkoxyalkyl or alkylthioalkyl acrylate. A preferred range is 0.2 to 1.0 percent.

When stage I is polymerized in emulsion the particle size at the end of said polymerization is important. As the particle size is reduced to 1,500 A. diameter, the impact strength and other properties begin to suffer. Particle sizes greater than about 1,600 A. are preferred. As the particle size is increased above 2,000 A., the impact strength of the modified polymer continues to improve and there is no known upper limit to the particle size as to the effectiveness of the polymer as a modifier. The particle size measurements were made by standard light scattering methods (blue light) or by electron microscopy. It is important that as few as possible new particles are generated during the preparation of the second and third stages. It is preferred that essentially no new particles are generated during these latter stages. This may be achieved by maintaining the emulsifier level below the critical micelle concentration except at the beginning of stage I. Also, this condition may be attained by polymerization of a portion of the stage I monomer mix under conditions such that essentially all of the emulsifier is adsorbed on the particles formed. Measurement of the surface tension will indicate if this state has been attained. Surface tension has been found to exceed 60–65 dynes/centimeter. The remaining monomer mixture may then be charged gradually at an appropriate temperature, or be added incrementally. The batch size, temperature, the cooling capacity of the reactor, etc. all control the time required for addition of the stage I monomer mix. The portion polymerized initially (the seed) may be prepared in situ, or the proper quantity of preformed seed may be used, whichever is convenient.

Stage II is a rigid polymer. Stage II comprises a polymer of a monovinyl aromatic compound such as styrene, α-methylstyrene, vinyl toluene, tert-butylstyrene, halogen-substituted styrene such as chlorostyrene, dichlorostyrene, mixtures of these monomers, etc. It has been found that, although not necessary, crosslinking of stage II is beneficial in obtaining a preferred balance of properties, consistency of these properties, etc. The crosslinking monomers listed in conjunction with stage I may all be used for stage II. The monomers preferred for stage II are styrene, divinylbenzene and trivinylbenzene.

The monomer charge for stage II may be added in a single shot or may be added gradually, and an incremental addition is not precluded. The monomers may be emulsified before addition to the batch.

Upon essential completion of the polymerization of stage II the monomer charge of stage III may be charged. The composition of this third stage depends greatly upon the qualities desired in the modified polymer and on the compatibility of stage III in the polymer to be modified. In the case of vinyl chloride polymers a mixture of a bicyclic methacrylate described earlier and an alkyl methacrylate with or without other minor amounts of other monomers has been found to be particularly effective. The type of polymer chosen for the stage III particularly depends upon the level of service temperature desired the outdoor durabiilty desired and the balance of proper ties desired. For example, if the polymer to be modified is the vinyl chloride polymer described earlier, and a high resistance to deformation under load at elevated temperatures and outdoor weather resistance is desired, the monomers chosen may be a bicyclic methacrylate and alkyl methacrylate with or without minor amounts of other monomers. Should the interest be primarily in raising the DTUL, the monomers of stage III may be chosen from the group including α-methylstyrene, acrylonitrile, and styrene. Should the interest be in modifying the vinyl chloride polymers to provide good impact strength with excellent outdoor durability, the monomers chosen for stage III may be chosen from the group consisting of isobutyl methacrylate, methyl methacrylate and ethyl acrylate. Thus, the monomers satisfactory for inclusion in stage III monomer charge include: the bicyclic methacrylates or acrylates described earlier, alkyl methacrylates such as methyl methacrylate, ethyl methacrylate, n-propyl methacrylate, isopropyl methacrylate, n-butyl methacrylate, isobutyl methacrylate, n-hexyl methacrylate, 2-ethylhexyl methacrylate; cyclohexyl methacrylate, aryl, alkaryl or aralkyl methacrylates such as phenyl methacrylate, benzyl methacrylate, xylyl methacrylate; alkyl acrylates such as methyl acrylate, ethyl acrylate, n-butyl acrylate, 2-ethylhexyl acrylate; styrenes such as styrene, α-methylstyrene, ring-substituted styrene such as vinyltoluene, tert-butylstyrene, halogen-substituted styrene such as chlorostyrene, dichlorostyrene, etc., acrylonitrile, methacrylonitrile, etc. It is apparent to one skilled in the art that mixtures of these monomers may be chosen depending upon the qualities desired. The choice depends on the physical properties required and the polymer to be modified. In all cases, compatibility with the polymer to be modified is a major factor to be considered in the choice of the monomers of stage III. For example, methyl methacrylate or mixtures of the bicyclic methacrylate and alkyl methacrylate with or without other monomers in minor proportions are particularly effective in the vinyl chloride polymers. More particularly, mixtures of isobornyl methacrylate and methyl methacrylate are preferred. The ratio of isobornyl methacrylate to methyl methacrylate may vary from 95/5 to 5/95. Small amounts of other monomers may be included in this system. Preferred monomer systems for stage III are those based on major amounts, that is, greater than 50%, of those chosen from the group consisting of alkyl, bicyclic, aryl, cyclohexyl, alkaryl and aralkyl methacrylates and acrylates. More preferred are those systems for stage III containing greater than 90% of these acrylic monomers.

The monomer charge of stage III is preferably added as a mixture rather than adding each monomer separately. Again, the monomer charge may be emulsified before addition to the reaction vessel. The term "multi-stage" used throughout this application refers to the addition of stages using different proportions of the same components added in the three stages described earlier.

Those emulsifiers generally used in common emulsion polymerization techniques may be employed to prepare the polymers of this invention. Thus, anionic, cationic, or nonionic emulsifiers may be used. Mixtures of these may also be used. Anionic emulsifiers are preferred and more preferred is sodium or potassium lauryl sulfate and sodium dodecylbenzene sulfonate.

Initiators employed in common aqueous and emulsion polymerization techniques are satisfactory for the preparation of the polymers of this invention. These include sodium, potassium, or ammonium persulfate, with or without reducing agents such as sodium sulfite, sodium metabisulfite, sodium formaldehyde sulfoxylate, sodium hydrosulfite, sodium thiosulfate, etc. The temperature of the polymerization will depend on the nature of the initiator, and the recommended temperatures for each initiating system are well known to one skilled in the art. For example, with sodium persulfate in the absence of a reducing agent, a convenient temperature range is 60–90° C., with 70–80° C. preferred.

As noted earlier, each successive stage is polymerized in the aqueous emulsion or suspension of the earlier stages. Thus, stage II polymerizes primarily on the surface of the particles of stage I. Further, stage III is polymerized primarily on the particles comprised of stages I and II, and so on. It is not known exactly how the subsequent stages attach to the particles prepared in the earlier stage or stages. It is possible that the later stages polymerize in such close contact to these particles that covalent forces closely associate the various stages. It is equally feasible that the later stages significantly penetrate into the particles before and during polymerization, thus changing the composition of the earlier stages to some degree. It is also possible that there is essentially little penetration of the particles during the polymerization of the later stages. In this last possibility, the structure of the particles might be described as a core of stage I followed by subsequent sheaths of stages II, III, etc. Unfortunately, the physical and/or chemical structure of the particle construction is not known exactly and must be described in terms of the components used.

The solids content at the end of each stage will depend on the total amount of water and other materials charged during the preparation of the modifier. It is convenient, but not necessary, to adjust these amounts so that the final solids will be in the range of 30–50%, with 40–45% preferred.

The ratio of the amounts or proportions between the three stages varies widely depending upon: the polymer to be modified, the balance of physical properties desired, whether the polymer has already been modified for improved processing or for increased DTUL, the effectiveness of the modifier with particular polymers, etc. With 100 parts stage I the amount of stage II may vary from about 10 to about 80 parts and in some cases even up to 100 parts. The amount of stage II is preferred to be in the range of 10 to 60 parts per 100 parts of stage I. The amount of stage II most preferred is 20 to 40 parts per 100 parts of stage I. The amount of stage III per 100 parts of stage I may vary widely from about 20 parts to about 300 parts. In the lower range of about 10 parts to about 100 parts of stage III the modifier is particularly useful in vinyl chloride resins in which a processing and/or DTUL improver has already been added. In these instances, a range of 20 to 60 parts stage III per 100 parts of stage I is more preferred. In the upper range of proportions of stage III the modifier is particularly useful in modifying vinyl chloride polymers to provide not only improved impact strength but better processing and substantially increased DTUL. The range of 100 to 300 parts stage III per 100 stage I is preferred. In these instances the more preferred range is 200 to 300 parts stage III per 100 parts stage I. As the amounts of stages II and III are decreased, the physical properties of the modified polymer suffer, in particular compatibility and impact strength. Further, at lower levels of stages II and III isolation of the modifier using spray drying technique becomes increasingly difficult. As the amount of stages II and III is increased, the amount of modifier necessary to impart the desired impact strength must be considered. In the cases where processing modifiers and DTUL modifiers have already been added, lower quantities of stages II and III are preferred. However, when the modifier is designed to impart impact strength and to increase the DTUL, the proportion of stage III is increased substantially. Thus, the larger amount of modifier of this invention necessary to impart the desired impact strength is satisfactory under these conditions. As the amount of stage II is reduced, the impact strength improving effectiveness is reduced, the properties are more sensitive to processing conditions, etc. As the amount of stage II is increased, the amount of modifier necessary to impart the desired impact strength is increased, the outdoor durability is adversely affected, etc.

For example, when the modifiers of this invention are added to chlorinated polyvinyl chloride or chlorinated resins containing mode chlorine than the homopolymer of vinyl chloride, the amount of stage III is kept to a minimum in that no DTUL improvement is generally necessary.

As the proportion of stage III is increased, it becomes more incumbent to control the molecular weight of this stage. In other words, when the proportion of stage III is increased in order to improve the DTUL characteristics to a major degree or to act as a processing improver for the polymer to be modified (i.e., about 100 to 300 parts stage III per 100 parts stage I), the molecular weight of this stage begins to dominate or substantially affect the flow characteristics of the entire modifier and the modified polymer. This is particularly important when the modifiers of this invention are to be used with other polymers to prepare injection molding compounds. Under these circumstances chain transfer agents, such as mercaptans, may be used to control the molecular weight of stage III. Other than this optional addition to stage III, the addition of chain transfer agents is not necessary in any of the stages.

The modifiers of this invention are effective in vinyl chloride polymers which include the chlorinated polyvinyl chloride. These modifiers are also effective to increase toughness and other physical properties in rigid thermoplastic polymers. These polymers include but are not limited to the polymers of styrene, substituted styrene, acrylonitrile, methacrylonitrile, $\alpha$-methylstyrene, and copolymers of these; acrylic polymers such as alkyl methacrylate polymers and copolymers, in particular methyl methacrylate polymers and copolymers with minor quantities of alkyl acrylates; engineering plastics such as polycarbonates, polyacetals, polysulfones and the like; and other thermoplastic polymers.

The quantity of the modifiers of this invention incorporated in the polymers to be modified varies greatly, depending upon the exact composition of the modifier, the polymer to be modified, the physical properties desired, etc. One factor to be considered is the quantity of the modifiers of this invention necessary to obtain the desired impact strength. The modifiers of this invention are very effective at low levels of incorporation to yield good impact strength. For example, in vinyl chloride polymers, in particular the homopolymer of vinyl chloride, the addition of sufficient modifier to provide less than 1% stage I on the total polymer mix hardly affects the impact strength. As the stage I content is increased to 2% on the weight of modified polymer, the impact strength is only slightly affected. At 3% levels of stage I on the total modified polymer weight, the improvement on impact strength is significant but still at a low level. At levels of stage I on the total modified polymer weight of less than 5%, the impact strength is marginal. In vinyl chloride polymers wherein the DTUL modifier has already been added, the preferred stage I level is 7.5 to 10% based on the total weight of the modified polymer. As the stage I level is increased further, the improvement in impact strength obtained per amount of stage I included is continuously reduced, and it is preferred to be less than 20% on the total modified polymer weight in vinyl chloride polymers.

These modifier levels vary depending upon the polymer to be modified. For example, with chlorinated polyvinyl chloride, less than 5% stage I content on the total modified polymer gives only slight improvement in impact resistance. Further, the incorporation of 7.5% stage I gives only moderate improvement in impact strength of the total polymer. A range of 6% to 9% stage I is preferred on the total modified polymer weight based upon chlorinated polyvinyl chloride. In poly(methyl methacrylate) polymers, 15% of stage I gives moderate impact resistance and greater than 25% of stage I is preferred, the percentages being based on the total weight of the modified polymer.

The modifiers of this invention may be added in the range of about 1% to 50%, based on the total weight of the modified polymer. Stated otherwise, the modifiers of this invention are effective when incorporated in the weight range of 1 to 100 parts per 100 parts of polymer to be modified. At levels higher than 50%, the modifiers of this invention are effective, but must be considered as being modified by the polymer or polymers to which they are added.

For example, in vinyl chloride polymers in which a DTUL improver has been added, the preferred range of incorporation of the modifier is 6 to 40%. A more preferred range is 9 to 27%. The most preferred range is 10 to 20%. In vinyl chloride polymers in which the modifier is designed to act as an impact improver, DTUL improver and processing aid, higher levels of incorporation are acceptable. In these instances, a preferred level of incorporation of this multifunctional modifier is 10 to 50% and above; a more preferred range is 16% to 50% and above. The most preferred range is from 25 to 50% and above.

Throughout this application the compounds of this invention have been referred to as "modifiers." However, the polymers of this invention may be used alone to take advantage of superior properties, in particular high impact strength and resistance to heat deformation at elevated temperatures, outdoor weather resistance, etc. The polymers as prepared by this invention may be used by incorporating additives such as plasticizers, processing agents, stabilizers, etc., for example, as a molding compound.

To assist those skilled in the art to practice the present invention, the following modes of operation are suggested by way of illustration, parts and percentages being by weight unless otherwise specifically noted:

PROCEDURE 1

To a suitable reactor kettle fitted with a stirrer, condenser, holding tank, and means for bubbling inert gas through the reaction mixture, there are charged 534 parts deionized water, 0.14 part sodium lauryl sulfate and 0.28 part sodium persulfate. After the solid materials have dissolved, 56.3 parts n-butyl acrylate and 0.28 part 1,3-butylene diacrylate are charged. Nitrogen is bubbled through the stirred mixture and the batch is heated to 60° C. When polymerization begins the nitrogen sparge is stopped and a very slow nitrogen sweep is maintained over the liquid. After 45 minutes from the incidence of polymerization at 60–65° C., a solution of 1.25 parts sodium lauryl sulfate is added as a 15% solution in deionized water. The batch is stirred for five minutes and a mixture of 248 parts n-butyl acrylate and 1.23 parts 1,3-butylene diacrylate is added. In small batches this charge may be added in one shot, but under production conditions the addition may take one to two hours. During this addition the temperature is maintained in the range of 70–80° C. (end of stage I). The stirring is continued for 15 minutes after the monomer charge addition has been completed. The mixture is then cooled to 50° C.

A sample of the emulsion at the end of stage I (15 minutes after the addition of n-butyl acrylate and 1,3-butylene diacrylate has been completed) is found by standard light scattering techniques to have a particle diameter of 2.095 A. as measured with blue light. There is charged 195 parts deionized water and 0.42 part diisopropylbenzene hydroperoxide (supplied as 54% in benzene). Five minutes after this charge has been added, 0.42 part (supplied as a 10% aqueous solution) of sodium formaldehyde sulfoxylate is added. Five minutes later a mixture of 82.6 parts styrene monomer and 1.69 parts divinylbenzene (40–60% active) is added. The temperature of the batch is maintained in the range of 50–55° C. for one hour and then raised to 75° C. and held for 30 minutes (end of stage II).

A mixture of 79.1 parts isobornyl methacrylate and 79.1 parts methyl methacrylate is charged and the batch is held for one hour at 70–80° C. (end of stage III). The batch is then cooled to 50° C., filtered through cheesecloth, and the modifier is isolated by spray drying.

PROCEDURE 2

Procedure 1 is repeated except that ten times as much 1,3-butylene diacrylate is used. The diameter of the emulsion particles at the end of stage I is 1868 A. The apparent intrinsic viscosity of the multipolymer is 1.08 dl./gm. in tetrahydrofuran at 30° C.

PROCEDURE 3

Procedure 1 is repeated except that one-tenth as much 1,3-butylene diacrylate is used. The diameter of the emulsion particles is 2,084 A. at the end of stage I. The apparent intrinsic viscosity for the final product is 1.0 dl./gm. in tetrahydrofuran at 30° C.

PROCEDURE 4

Procedure 1 is repeated except that the divinylbenzene of stage II is omitted. The particle size at the end of stage I is 2090 A.

PROCEDURE 5

Procedure 1 is repeated except that six times as much sodium lauryl sulfate is used to prepare the seed latex. The second charge of emulsifier is unchanged. This change results in a particle size of 1520 A. at the end of stage I.

PROCEDURE 6

Example 1 is repeated except that 158.2 parts of methyl methacrylate is used in stage III instead of the mixture of isobornyl methacrylate and methyl methacrylate. The methyl methacrylate is added gradually. At the end of stage I, the particle size is larger than 2,300 A. The apparent intrinsic viscosity of the final polymer is 0.44 dl./gm. in tetrahydrofuran at 30° C.

PROCEDURE 7

Dry blends are prepared by thoroughly mixing the following ingredients in a Waring Blendor for 2 to 3 minutes:

| | Parts |
|---|---|
| Vinyl chloride homopolymer (medium molecular weight) | 61 |
| DTUL modifier [1] | 22 |
| Modifier (as prepared in Examples 1 to 6) | 17 |
| Titanium dioxide (RANC), when used | 3 |

[1] DTUL modifier refers to deformation temperature under load improver as prepared in application Ser. No. 644,473, filed June 8, 1967, now abandoned, and copending continuation application Ser. No. 723,289, filed Apr. 22, 1968, now U.S. Pat. No. 3,485,775, such as a copolymer of 50% isobornyl methacrylate and 50% methyl methacrylate.

Heat stabilizers are commonly added to compounds based on vinyl chloride polymers such as organotin compounds, etc. Lubricants may also be used as well as oxidation inhibitors.

The mixes are blended on a 2-roll mill at 365° F. for five minutes after fluxing. The mixes are then compression molded by conventional methods, cooled under pressure, and test specimens cut for determinations of impact strength and DTUL, at 264 p.s.i. The Izod impact strength (IZOD), reported in foot pounds per inch of notch, is determined according to ASTM D–256–56. The DTUL, reported in degrees centigrade, is determined in accordance with ASTM D–648–56 (1961).

The following properties are obtained with the modifiers noted:

| Modifier | RANC present? | Izod impact | DTUL |
|---|---|---|---|
| None | No | 0.5–0.7 | 70 |
| Example: | | | |
| 1 | No | 15.3–17.7 | 75 |
| 1 | Yes | 13.1–15.1 | 760 |
| 2 | No | 0.8–1.5 | 73–74 |
| 2 | Yes | 1.0–1.1 | 75 |
| 3 | No | 6.6–11.0 | 74 |
| 3 | Yes | 2.4–7.7 | 76 |
| 4 | No | 7.3–14.6 | 75 |
| 4 | Yes | 2.2–6.3 | 77 |
| 5 | No | 7.5–18.1 | 71 |
| 5 | Yes | 2.3–12.7 | 73 |
| 6 | Yes | 10.4–12.1 | 73 |

PROCEDURE 8

Procedure 1 is repeated, except that stage III is added as a mixture of 685 parts isobornyl methacrylate and 685 parts methyl methacrylate. Incorporating 39 parts of the resulting modifier in medium molecular weight vinyl chloride homopolymer using Procedure 7, an excellent polymer is obtained. The Izod is 12 to 13 ft.-lb./inch per notch, and the Vicat temperature is 95° C. Good results are also obtained when ten times the charge of stage III is used in Procedure 1.

PROCEDURE 9

Procedure 1 is repeated, except that the stage III monomer charge is composed of 368.5 parts methyl methacrylate, 158.2 parts ethyl acrylate, and 0.527 part tert-butyl mercaptan. The modifier is substituted into Procedure 7 except that the formulation is as follows:

|  | 9A | 9B |
|---|---|---|
| Vinyl chloride homopolymer (low molecular weight), parts | 73 | 62.5 |
| DTUL modifier—Copolymer of 50% methyl methacrylate and 50% isobornyl methacrylate, parts |  | 10.5 |
| Modifier of Procedure 9, parts | 27 | 27 |
| Titanium dioxide (RANC), parts | 3 | 3 |

Typical physical properties obtained from the compression moldings of Compounds 9A and 9B are shown in Table I:

TABLE I.—EFFECT OF MODIFIER ON MELT FLOW AND IMPACT STRENGTH

|  | Compound | |
|---|---|---|
| Value | 9A | 9B |
| Izod | 22–23 | 13.5–15 |
| Vicat softening temperature (° C.) | 79 | 83 |
| DTUL |  | 76 |
| Melt viscosity at 400° F./1,000 sec.$^{-1}$ (poise) | 3,300 | 3,230 |

Excellent results are obtained when Compounds 9A and 9B are injection molded.

PROCEDURE 10

Procedure 1 is repeated except that the stage III monomer charge is composed of 474.5 parts methyl methacrylate and 52.6 parts ethyl acrylate without any molecular weight or chain regulators. A dry mix is prepared by blending the following ingredients: 80 parts high molecular weight vinyl chloride homopolymer, 20 parts of the modifier of this procedure 10, and 3 parts titanium dioxide along with appropriate stabilizers and the like. The compound is extruded into a sheet through a single screw machine with barrel and die temperatures in the range of 350° to 400° F. Impact strength tests on this sheet indicate that the sheet is isotropic:

Izod at 70° F.:
 Parallel to extrusion _____ 24.9
 Perpendicular to extrusion _____ 24.2

Izod at 50° F.:
 Parallel to extrusion _____ 22.9
 Perpendicular to extrusion _____ 21.9

Izod at 32° F.:
 Parallel to extrusion _____ 18.4
 Perpendicular to extrusion _____ 18.7

PROCEDURE 11

Procedure 1 is repeated, except that the stage III monomer charge is composed of 23.6 parts of isobornyl methacrylate, 134.6 parts methyl methacrylate, and 0.79 part tert-butyl mercaptan. When this modifier is substituted into the formulation of Procedure 7, the Izod obtained is 3 to 6 ft.-lbs./inch of notch and the Vicat temperature is 91° C. The melt flow rate at 400° F./1000 seconds$^{-1}$ is about 3200. An identical procedure, eliminating the mercaptan, yields a melt flow rate of about 4000.

PROCEDURE 12

Procedure 1 is repeated, except that stage III is composed of 23.6 parts isobornyl methacrylate and 134.6 parts methyl methacrylate. This modifier is added to the level of 12% in chlorinated polyvinyl chloride which has a total chlorine content of 66–68%. Before modification, the chlorinated polyvinyl chloride has an Izod of about 0.7 ft.-lbs./inch of notch and a DTUL of about 105° C. At the 12% level of modifier, the Izod is 8 to 10 and DTUL is about 103.

PROCEDURE 13

Procedure 1 is repeated, except that the stage III charge is composed of 94.8 parts α-methylstyrene, 47.4 parts acrylonitrile, and 15.8 parts styrene. The intrinsic viscosity of the modifier is 0.30 dl./gm. in ethylene dichloride. This modifier may be substituted for the one used in Procedure 7 above.

PROCEDURE 14

Procedure 1 is repeated, except that either 2-ethylhexyl acrylate, decyl/octyl acrylates (mixture) or butoxyethyl acrylate is substituted for the total charge of n-butyl acrylate. When the modifier containing 2-ethylhexyl acrylate is used in Procedure 7, a polymer with an Izod of 2 is obtained.

When the mixture of decyl and octyl acrylates is used in Procedure 1, the particle diameter at the end of stage I is about 2136 A. When the modifier obtained is used in Procedure 7, an Isod of about 11 is obtained When butoxyethyl acrylate is used in Procedure 1, the particle diameter at the end of stage I is about 2259 A. and the refractive index ($n_D$) at the end of Procedure 1 is about 1.466, and the intrinsic viscosity is 0.43 dl./gm. When this modifier is used in Procedure 7, the Izod is about 5. Good results are also obtained when octoxyethyl acrylate and ethoxyethyl acrylate is used as above.

PROCEDURE 15

Procedure 1 is repeated except that the same weight monomer charges comprise for stage I 55% ethylthioethyl acrylate, 45% ethyl acrylate and 0.5% divinylbenzene; for stage II, 86% tert-butylstyrene, 10% styrene, and 2% divinylbenzene; and for stage III, 100% methyl methacrylate. The particle diameter at the end of stage I is 2240 A.

When 20 parts by weight of this modifier is added to 80 parts by weight of polyvinyl chloride, using the methods of Procedure 7, an Izod of greater than 15 is obtained.

PROCEDURE 16

Procedure 1 is repeated, except that either 82.6 parts chlorostyrene, 82.6 parts tert-butylstyrene, or 82.6 parts vinyltoluene (mixture of o and p) are substituted in stage II. When the modifiers obtained are substituted in procedure 7, satisfactory results are obtained.

Procedure 1 is repeated, except that the amount of polyfunctional monomer in stage II is varied from 0 to 25% of the weight of the stage II monomer charge. Good results are obtained in this range.

PROCEDURE 17

Procedure 1 is repeated by adding the same weight amount of the stage III monomer charge, except that the following weight ratios of monomers are used, yielding the Izod noted when used in Procedure 7.

Stage III monomer charge: Izod
 30 isobutyl methacrylate/70 methyl methacrylate _____ 14–15
 30 trichloroethyl methacrylate/70 methyl methacrylate _____ 14–16
 30 benzyl methacrylate/70 methyl methacrylate _____ 15
 30 styrene/70 methyl methacrylate _____ 12–13
 50 chlorostyrene/50 methyl methacrylate ___ 12–14
 50 tert-butylstyrene/50 methyl methacrylate _ 12–14

PROCEDURE 18

The modifier as prepared in Procedure 1 is effective in concentrations of 5 to 50% on the total weight of modified polymer for improving impact strength in polymers of methyl methacrylate and styrene and copolymers of these monomers with other common monomers such as alkyl acrylate, acrylonitrile and α-methylstyrene.

PROCEDURE 19

The polymer as prepared in Procedure 8 is useful as a thermoplastic polymer to prepare moldings with good physical properties when used alone.

What is claimed is:

1. As a composition of matter, a thermoplastic polymer formed by polymerization of 20 to 300 parts by weight of (A) at least one member of the group consisting of alkyl methacrylate or acrylate, aryl, alkaryl and aralkyl methacrylates or acrylates, monovalent bicyclic hydrocarbon methacrylates or acrylates, cyclohexyl methacrylates or acrylates, halogenated versions of these methacrylates and acrylates, monovinyl aromatic compounds, acrylonitrile and methacrylonitrile in an aqueous medium containing dispersed or suspended therein 110 to 200 parts by weight of polymer particles formed by polymerizing (B) 10 to 100 parts by weight of (a) at least one monovinyl aromatic compound or (b) a mixture of 99.95 to 75% (a) and 0.05 to 25% of at least one polyethylenically unsaturated monomer in an aqueous medium containing dispersed or suspended therein 100 parts by weight of particles having a diameter greater than about 2000 A. of a copolymer (C), having a second order transition temperature below —20° C., comprising (1) 99.95 to 98% by weight of at least one monomer chosen from the group consisting of alkyl, alkylthioalkyl or alkoxyalkyl acrylates having 2 to 14 carbon atoms in the alkyl, alkylthioalkyl or alkoxyalkyl group and 0.05 to 2.0% by weight of (C) at least one polyethylenically unsaturated monomer.

2. The composition of claim 1 wherein copolymer (C) comprises butyl acrylate crosslinked with 1,3-butylene diacrylate.

3. The composition of claim 1 wherein polymer (B) comprises styrene.

4. The composition of claim 1 wherein copolymer (B) comprises styrene crosslinked with divinylbenzene, trivinylbenzene or mixtures thereof.

5. The composition of claim 1 wherein polymer (A) comprises at least one monomer chosen from the group consisting of methyl methacrylate and bicyclic methacrylate or acrylate of the formula

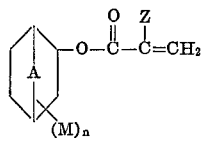

where
A is selected from the group consisting of —$CH_2$—, —$CH(CH_3)$—, and —$C(CH_3)_2$—;
Z is selected from the group consisting of a hydrogen atom and a $CH_3$ group, and
M is selected from the group consisting of a hydrogen atom and at least one methyl group and $n$ is a number with an average value falling between 0 and 3.

6. The composition of claim 5 wherein the bicyclic methacrylate is isobornyl methacrylate.

7. An intimately mixed vinyl chloride resin composition of improved impact strength, comprising vinyl chloride polymer having blended therewith 1 to 40 percent of the composition of claim 1 based on the total weight of the vinyl chloride resin composition.

8. The composition of claim 1 wherein (A) is present in an amount of about 20–300 parts by weight, (B) is present in an amount of about 10 to 100 parts by weight and (C) is present in an amount of 100 parts by weight.

9. The composition of claim 1 where (A) is present in an amount of about 20 to 100 parts by weight, (B) is present in amount of about 10 to 60 parts by weight and (C) is present in an amount of 100 parts by weight.

10. The composition of claim 1 wherein (A) is present in an amount of 20–60 parts by weight, (B) is present in an amount of 20–40 parts by weight and (C) is present in an amount of 100 parts by weight.

11. The composition of claim 1 wherein (A) is present in an amount of about 100 to 250 parts by weight, (B) is present in an amount of about 10 to 100 parts by weight and (C) is present in an amount of 100 parts by weight.

12. An intimately mixed vinyl chloride resin composition of improved processing characteristics, higher heat distortion temperature and higher impact strength comprising vinyl chloride polymers and blended therewith 10 to 50 percent of the composition of claim 5 based on the total weight of vinyl chloride resin composition.

13. The composition of claim 1 wherein (A) comprises isobornyl methacrylate and methyl methacrylate, (B) comprises styrene crosslinked with divinylbenzene, trivinylbenzene or mixtures thereof, (C) n-butyl acrylate crosslinked with 1,3-butylene diacrylate.

14. The composition of claim 1 wherein the thermoplastic polymer comprises 20–300 parts (A) consisting of 5 to 95 percent by weight isobornyl methacrylate and 95 to 5 percent methylmethacrylate, 10–60 parts by weight (B) consisting of 5 to 100 percent styrene and 0 to 5 percent divinylbenzene, trivinylbenzene or mixtures thereof and 100 parts (C) consisting of 98 to 99.95 percent n-butyl acrylate and 0.05 to 2.0 percent butylene diacrylate.

References Cited
UNITED STATES PATENTS

| | | | |
|---|---|---|---|
| 3,448,173 | 6/1969 | Ryan et al. | 260—876 |
| 3,485,775 | 12/1969 | Cenci et al. | 260—899 |
| 3,536,788 | 10/1970 | Hurwitz et al. | 260—876 X |

SAMUEL H. BLECH, Primary Examiner

U.S. Cl. X.R.

260—29.6 RD, 29.7 DP, 41 B, 79.7, 86.1 E, 873, 881, 884, 885